United States Patent
Schnaibel et al.

(10) Patent No.: US 7,818,999 B2
(45) Date of Patent: Oct. 26, 2010

(54) PROCEDURE TO MEASURE THE OXYGEN STORAGE CAPABILITY OF AN EMISSION CONTROL SYSTEM

(75) Inventors: Eberhard Schnaibel, Hemmingen (DE); Christoph Woll, Gerlingen (DE); Klaus Hirschmann, Bayerisch Gmain (DE); Richard Hotzel, Stuttgart (DE); Magnus Labbe, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/636,022

(22) Filed: Dec. 8, 2006

(65) Prior Publication Data

US 2007/0137178 A1 Jun. 21, 2007

(30) Foreign Application Priority Data

Dec. 15, 2005 (DE) .................. 10 2005 059 894

(51) Int. Cl.
 *G01M 15/10* (2006.01)
(52) U.S. Cl. ..................................... 73/114.73
(58) Field of Classification Search .............. 73/114.69, 73/114.71, 114.72, 114.73, 114.75
See application file for complete search history.

(56) References Cited

U.S. PATENT DOCUMENTS

| | | | | |
|---|---|---|---|---|
| 5,842,339 A | * | 12/1998 | Bush et al. | 60/274 |
| 5,848,528 A | | 12/1998 | Liu | |
| 5,862,661 A | * | 1/1999 | Zhang et al. | 60/274 |
| 6,119,447 A | | 9/2000 | Eriksson et al. | |
| 6,151,888 A | * | 11/2000 | Schneider et al. | 60/274 |
| 6,161,428 A | * | 12/2000 | Esteghlal et al. | 73/114.75 |
| 6,564,543 B1 | * | 5/2003 | Orzel et al. | 60/277 |
| 6,581,371 B1 | * | 6/2003 | Orzel et al. | 60/277 |
| 6,874,313 B2 | * | 4/2005 | Yurgil et al. | 60/277 |
| 7,021,129 B2 | * | 4/2006 | Busch et al. | 73/114.75 |

(Continued)

FOREIGN PATENT DOCUMENTS

DE 38 16 558 A1 11/1989

(Continued)

*Primary Examiner*—Eric S McCall
(74) *Attorney, Agent, or Firm*—Merchant & Gould P.C.

(57) ABSTRACT

The invention concerns a procedure to determine the oxygen storage capability of an emission control system with an exhaust gas sensor with discrete-level ability disposed in front of the emission control system.

If in a period of time before the determination of the oxygen storage capability, the control intervention of the exhaust gas sensor is ascertained, and if this mean value is taken into consideration when calculating the fuel-delivery control phase during the determination of the oxygen storage capability of the emission control system, or if this mean value is used to correct the lambda value used to calculate the amount of oxygen stored, an improved measuring accuracy can be achieved while using a cost effective discrete level sensor. In that during the rich or lean operation of the cycle to determine the oxygen storage capability, the mean value of the control intervention is used for the calculation, pre-control errors are compensated for, as they can arise, for example, through dispersion of the injection valves or errors in the acquisition of cylinder fill. If the mean value is used to correct the lambda value, the amount of oxygen stored can be more accurately determined as a result of the measured air mass. In the procedure according to the invention, a cost effective step discrete-level sensor can be used in front of the emission control system.

10 Claims, 2 Drawing Sheets

U.S. PATENT DOCUMENTS

| | | |
|---|---|---|
| 2004/0040286 A1* | 3/2004 | Fiengo et al. ............... 60/285 |
| 2004/0159094 A1* | 8/2004 | Yurgil et al. ............... 60/277 |
| 2006/0272315 A1* | 12/2006 | Wang et al. ............... 60/276 |

FOREIGN PATENT DOCUMENTS

| | | |
|---|---|---|
| DE | 41 12 478 C2 | 10/1992 |
| DE | 10 2004 015 836 | 11/2005 |
| EP | 0 546 318 B1 | 6/1993 |

\* cited by examiner

PROCEDURE TO MEASURE THE OXYGEN STORAGE CAPABILITY OF AN EMISSION CONTROL SYSTEM

BACKGROUND

The invention concerns a procedure to determine the oxygen storage capability of an emission control system with an exhaust gas sensor with a discrete-level ability disposed in front of the emission control system. The emission control system can, for example, concern a three-way catalytic converter, which is deployed in a vehicle with a gasoline engine in order to transform toxic exhaust gas components into harmless gases through an oxidation or reduction reaction. The storage capability for oxygen of an emission control system is utilized for the purpose of taking in oxygen in the lean phases and giving it off again in the rich phases. As a result of this even the toxic gas components of the exhaust gas, which are to be oxidized, can be converted. The lambda value one will thus be constantly measured at the outlet of the emission control system. Hence, a stoichiometric balance of the oxidizing and reducing agents occurs. With an increasing deterioration of the emission control system, its storage capability for oxygen reduces. As a result oxygen can no longer be sufficiently provided in the rich phases to purge the exhaust gas of toxic gas components, and the lambda sensor behind the emission control system detects these components to be oxidized. Furthermore, this lambda sensor detects the oxygen in longer lean phases, which can no longer be stored by the emission control system. In many countries a test of the emission control system during vehicle operation is legally mandatory using an engine management system (On-board-Diagnosis). A known diagnostic procedure is to determine the oxygen storage capability of the emission control system, as according to experience the conversion capability also decreases with the storage capability.

A known procedure is based upon initially displacing the lambda value in front of the emission control system in the rich direction to a lambda value smaller than 1 and during this phase to remove all of the oxygen out of the catalytic converter. In a subsequent lean phase with a lambda value greater than 1, the catalytic converter is loaded with the excess oxygen until exhaust gas containing oxygen appears at its outlet. The amount of oxygen put in storage up to that point is the storage capability of the catalytic converter.

In the German patent DE 41 12 478 C2 a procedure to appraise the degree of deterioration of a catalytic converter is described, in which the lambda values in front of and behind the catalytic converter are measured;

it is examined, if in the case of a norm oscillation in front of the catalytic converter from rich to lean or vice versa, the lambda value behind the catalytic converter shows a corresponding transition and then, if this is the case;

the gas quantity stream flowing through the catalytic converter is determined;

the chronological integral of the product from the gas quantity stream and the lambda value behind the catalytic converter are calculated;

and as a unit of measurement for the degree of deterioration either the difference between the two integrals or the quotient from the two integrals or the quotient from the difference and from one of the two integrals is used.

A disadvantage of the procedure described is that the lambda value in front of the emission control system has to be measured with a complex wideband lambda sensor in order to decide on the amount of oxygen introduced or extracted by way of the integration of the product from the actual lambda value and gas quantity stream.

An additional procedure to determine the oxygen storage capability of an emission control system is described in the patent EP 0546 318 B1. The system is acted upon by a lambda progression, whose oxygen deficiency input at the beginning is higher than the oxygen storage capability of the catalytic converter. The oxygen input is so selected, that the catalytic converter in the lean phases is in each instance filled to its capacity limit. To determine the oxygen storage capability of the catalytic converter, the median lambda value in front of the catalytic converter during the lambda oscillations of the system is displaced intentionally in the lean direction and in so doing the oxygen extraction is reduced from phase to phase. By determining the number of rich-lean-transitions, which the lambda sensor disposed behind the catalytic converter indicates, the oxygen storage capability can be determined, whereby an increased number of phases means a reduced storage capability.

A disadvantage to this procedure is that toxic exhaust gas is released in the lean phases.

The German patent DE 3816558 A1 discloses a procedure to control the lambda value of the air/fuel-mixture to be supplied to an internal combustion engine with the help of a medium for the two-step control with specified closed-loop control parameters, to which (the medium) the signal of the control lambda sensor, which has a discrete-level ability, is to be supplied for the formation of a control deviation is thereby characterized, in that for the respective operating state at hand a lambda measurement set point is established, the median lambda value is used as the lambda measurement actual value, the measurement deviation between the lambda measurement set point and the lambda measurement actual value is calculated and at least one control parameter as a function of the measurement deviation is altered in such a way, that a lambda measurement actual value should arise, which reduces the stated measurement deviation.

The procedure indeed applies to a lambda sensor with a discrete-level ability in front of an emission control system and mentions an averaging of the lambda value, does not, however, apply to an open-loop control of the lambda value for the testing of an emission control system.

SUMMARY

It is the task of the invention to create a procedure, which allows for a greater accuracy in determining the oxygen storage capability of an emission control system using a simple configuration.

The task is thereby solved, in that in a period of time before the determination of the oxygen storage capability, the control intervention of the exhaust gas sensor is ascertained, and this mean value is taken into account when calculating the fuel metering during the determination of the oxygen storage capability of the emission control system, or this mean value is used to correct the lambda value used to calculate the amount of oxygen which has been stored. In that during the rich and lean operation of the cycle to determine the oxygen storage capability, the mean value of the control intervention is used for the calculation, pre-control errors are compensated for, as they can, for example, arise by way of dispersion of the injection valves or errors in the acquisition of cylinder fill. If the mean value is used to correct the lambda value, the amount of oxygen stored can be more accurately determined due to the measured air mass. A cost effective discrete-level sensor can be used in front of the emission control system in the procedure according to the invention.

If the mean value is included multiplicatively in the calculation for fuel amount, the calculation of the correct fuel-delivery control phase from the fuel-delivery control phase determined from the pre-control is especially simple.

If the averaging and the determination of the oxygen storage capability of the emission control system are initiated only at a steady state operating point of the engine management system, the following events can be achieved: the averaging can result very quickly and furthermore, during the determination of the oxygen storage capability of the internal combustion engine, a largely constant mixture is supplied, whose lambda value is subject to only slight fluctuations.

The accuracy of the determination of the oxygen storage capability can be additionally improved, in that the averaging and the determination of the oxygen storage capability of the emission control system are initiated at the same operating point of the engine management system, as the errors of the mixture pre-control are generally dependent upon the operating points and consequently can be avoided with this embodiment of the procedure.

Constant operating ratios of the internal combustion engine can be created, in that a fuel tank ventilation valve is closed before the averaging and the determination of the oxygen storage capability of the emission control system and/or diagnoses with active intervention into the engine management system are blocked out. In so doing the accuracy of the determination of the oxygen storage capability can be improved.

BRIEF DESCRIPTION OF THE DRAWINGS

The invention is explained below in more detail using one of the examples of embodiment depicted in FIG. 1, and as shown schematically at FIG. 2.

DETAILED DESCRIPTION

Figure 1:
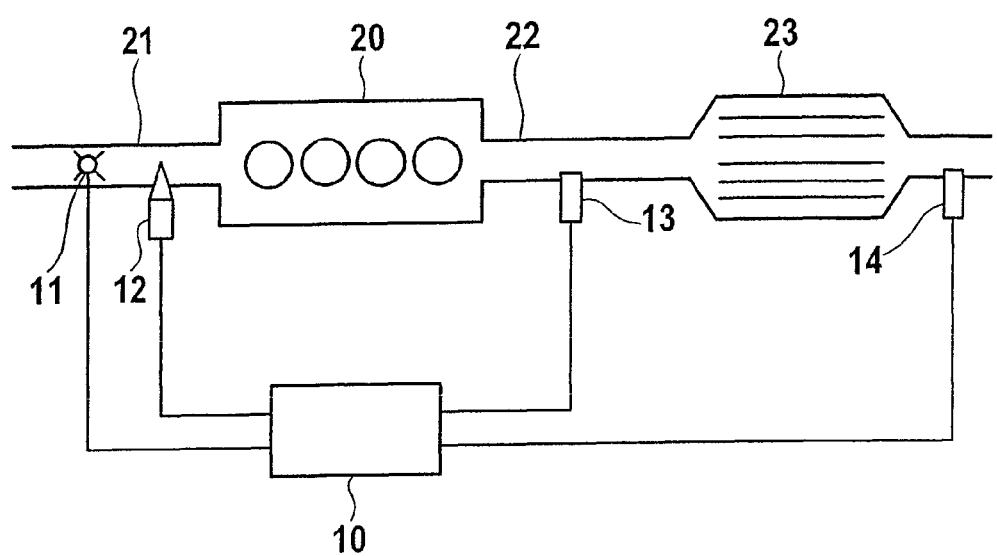
FIG. 1 shows in schematic depiction an internal combustion engine with an emission control system.
Figure 2:
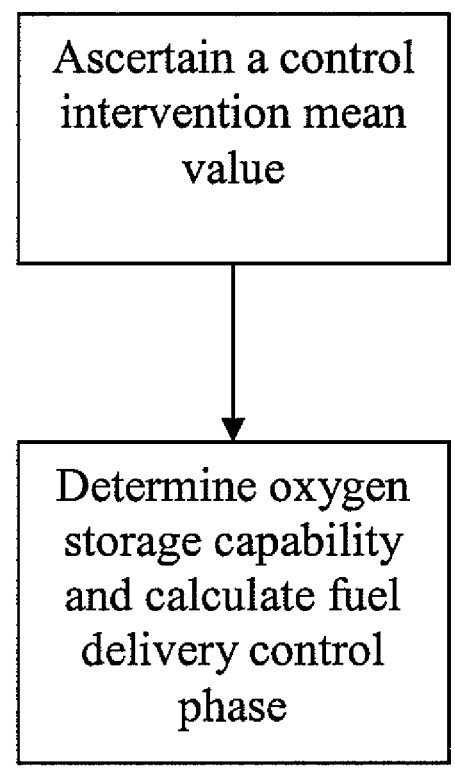

FIG. 1 shows an internal combustion engine 20, which is controlled by an engine management system 10 and whose exhaust gas is cleaned with an emission control system 23. The internal combustion engine 20 is supplied by way of a delivery air channel 21 with combustion air, whose mass is determined with an air mass gauge 11. The measured air mass is forwarded to the engine management system 10 for the calculation of a fuel amount to be injected. In order to generate the fuel-mixture, the fuel-delivery control phase specified by the engine management system is conducted in the delivery air channel 21 by means of an injection jet 12. Provision is made for an exhaust gas sensor 13 in an exhaust gas tract 22 behind the internal combustion engine 20. With the help of the exhaust gas sensor 13, the engine management system 10 can adjust a lambda value, which is suitable for the subsequent emission control system 23 for achieving an optimal cleaning effect. This exhaust gas sensor 13 is designed as a simple and cost effective discrete-level sensor. The exhaust gas sensor 13 is connected to the engine management system 10, in order to deliver required data for the fuel-delivery control phase at the injection jet 12. Furthermore, it delivers data for the determination of the oxygen storage capability in accordance with the procedure according to the invention.

A second exhaust gas sensor 14 is disposed in the exhaust gas tract 22 behind the emission control system 23. The data of the second exhaust gas sensor 14 is evaluated in the engine management system and serves the purpose of determining the oxygen storage capability of the emission control system in a procedure according to the state of the art.

For this to take place, the internal combustion engine 20 is initially operated rich sufficiently long, thus with a fuel surplus, in order to reduce all of the oxygen in the emission control system. In the subsequent lean operation, oxygen is put into storage in the emission control system, whereby it is determined with the exhaust gas sensor, if oxygen rich exhaust appears as a result of the oxygen storage capability being exceeded. Generally the exhaust gas sensor 14 is designed as a discrete-level sensor. The oxygen content of the gas mixture fed into the emission control system 23 is in the process preset to a predetermined value by the engine management system 10. The amount of gas is determined with the air mass gauge 11.

As the exhaust gas sensor 13 is designed as a discrete-level sensor, only a closed-loop control to a set point of lambda=1 is possible. Therefore no closed-loop lambda control can be active during the determination of the oxygen storage capability. In this operational phase, only a pre-control of the fuel mixture with a lambda value predetermined by the engine management system 10 results. In so doing, the fuel-delivery control phase by means of the injection jet 12 is adjusted to the air mass determined by means of the air mass gauge 11. Pre-control errors like a dispersion of the injection valves or errors in the acquisition of cylinder fill falsify the lambda value and lead, therefore, to errors in the determination of the oxygen storage capability.

In accordance with the procedure according to the invention, the control intervention of the exhaust gas sensor 13 is ascertained shortly before the determination of the oxygen storage capability of the emission control system 23. This mean value of the control intervention is also taken into consideration during the rich and lean operation when calculating the fuel-delivery control phase. In so doing, pre-control errors are compensated for and the lambda value used to calculate the oxygen storage capability lies closer to the lambda value actually appearing.

The invention claimed is:

1. A method of determining an oxygen storage capability of an emission control system having an exhaust gas sensor with discrete-level ability disposed in front of an emission control system, the method comprising:
   ascertaining a control intervention mean value of the exhaust gas sensor in a period of time before the determination of the oxygen storage capability; and
   determining the oxygen storage capability, wherein the control intervention mean value is taken into consideration when calculating a fuel-delivery control phase during the determination of the oxygen storage capability of the emission control system, and wherein no closed-loop lambda control is active during the determination of the oxygen storage capability of the emission control system.

2. A method according to claim 1, wherein the mean value is included in calculating a fuel-delivery amount.

3. A method according to claim 1, wherein ascertaining the control intervention mean value and determining the oxygen storage capability of the emission control system are initiated only at a steady state operating point of an engine management system.

4. A method according to claim 1, wherein ascertaining the control intervention mean value and determining the oxygen storage capability of the emission control system are initiated at the same operating phase of the engine management system.

5. A method according to claim 1, further comprising before ascertaining the control intervention mean value and determining the oxygen storage capability of the emission control system, closing a fuel tank ventilation valve.

6. A method of determining an oxygen storage capability of an emission control system having an exhaust gas sensor with discrete-level ability disposed in front of an emission control system, the method comprising:
   ascertaining a control intervention mean value of the exhaust gas sensor in a period of time before the determination of the oxygen storage capability; and
   determining the oxygen storage capability, wherein the control intervention mean value is used to correct a lambda value from an exhaust gas sensor downstream of the emission control system, the lambda value from the sensor downstream of the emission control system being used to calculate the amount of oxygen stored, and wherein no closed-loop lambda control is active during the determination of the oxygen storage capability of the emission control system.

7. A method according to claim 6, wherein the mean value is included in calculating a fuel-delivery amount.

8. A method according to claim 6, wherein ascertaining the control intervention mean value and determining the oxygen storage capability of the emission control system are initiated only at a steady state operating point of an engine management system.

9. A method according to claim 6, wherein ascertaining the control intervention mean value and determining the oxygen storage capability of the emission control system are initiated at the same operating phase of the engine management system.

10. A method according to claim 6, further comprising before ascertaining the control intervention mean value and determining the oxygen storage capability of the emission control system, closing a fuel tank ventilation valve.

* * * * *